United States Patent [19]
Sons, Jr.

[11] 4,235,275
[45] Nov. 25, 1980

[54] RIM CONSTRUCTION FOR TROUBLE-FREE TIRE MOUNTING

[75] Inventor: Charles C. Sons, Jr., Peoria, Ill.
[73] Assignee: Caterpillar Tractor Co., Peoria, Ill.
[21] Appl. No.: 949,321
[22] Filed: Oct. 6, 1978
[51] Int. Cl.² .............. B60B 25/10; B60C 25/12
[52] U.S. Cl. .................. 152/410; 301/35 SL; 29/159.1; 29/450; 157/1.33
[58] Field of Search .............. 152/405–410, 152/DIG. 10; 301/35 SL, 35 R, 35 SS; 29/450, 159.1; 157/1, 1.33

[56] References Cited

U.S. PATENT DOCUMENTS

| | | | |
|---|---|---|---|
| 1,989,188 | 1/1935 | Frank | 152/407 X |
| 2,537,624 | 1/1951 | Brink | 152/410 |
| 2,874,748 | 2/1959 | Powers | 152/406 |
| 2,884,984 | 5/1959 | Riggs | 152/410 |
| 4,003,421 | 1/1977 | Lejeune | 152/409 |

FOREIGN PATENT DOCUMENTS 1480847  3/1969  Fed. Rep. of Germany .......... 152/406

Primary Examiner—Charles A. Marmor
Attorney, Agent, or Firm—Phillips, Moore, Weissenberger, Lempio & Majestic

[57] ABSTRACT

A trouble-free tire mounting arrangement is disclosed. An axially extending slot is provided through a band structure which fits about a wheel rim base. An elastomeric ring is provided which fits over and in contact with the base, the elastomeric ring fitting against the inboard end of the band and against the bead portion of a tire.

6 Claims, 9 Drawing Figures

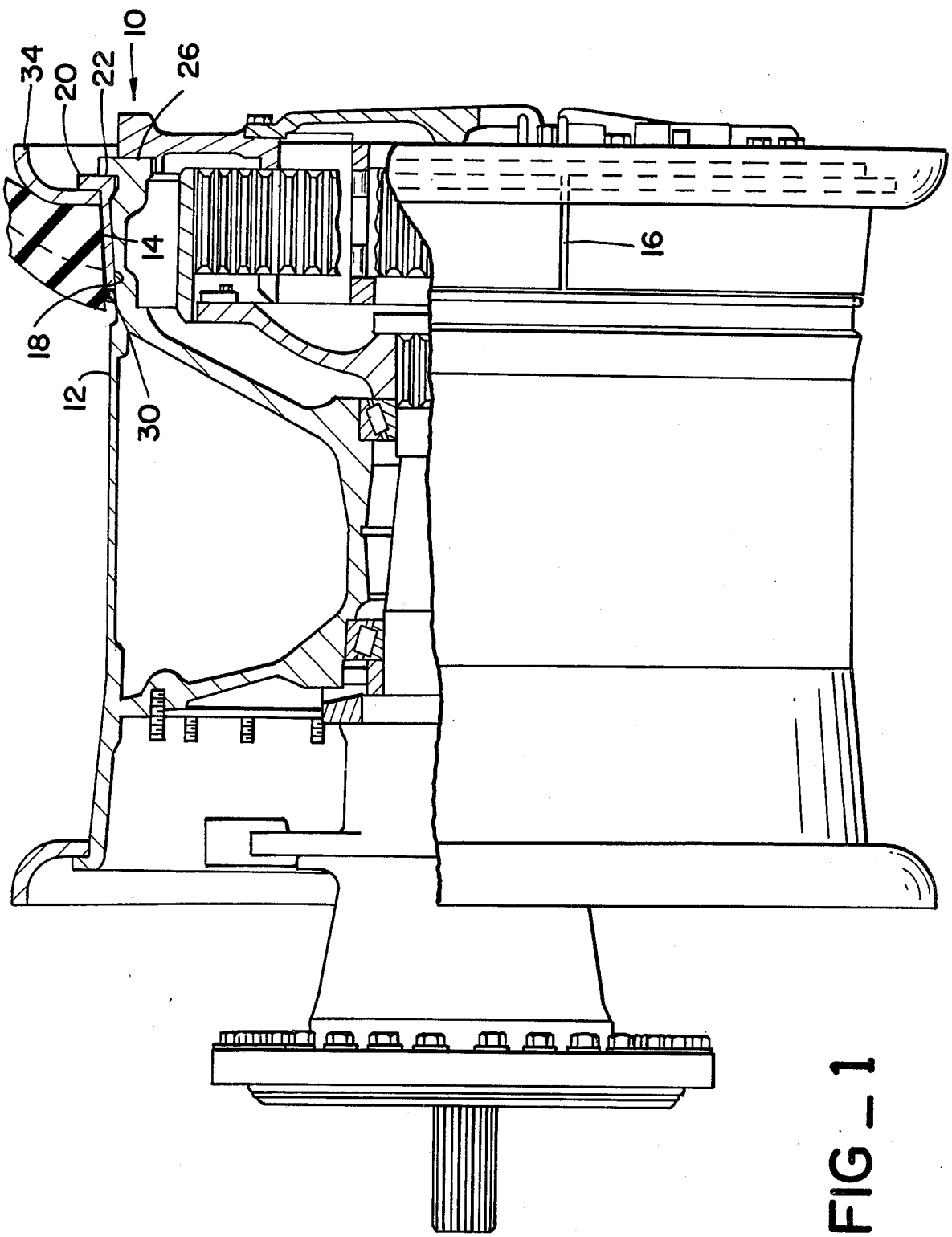
FIG_1

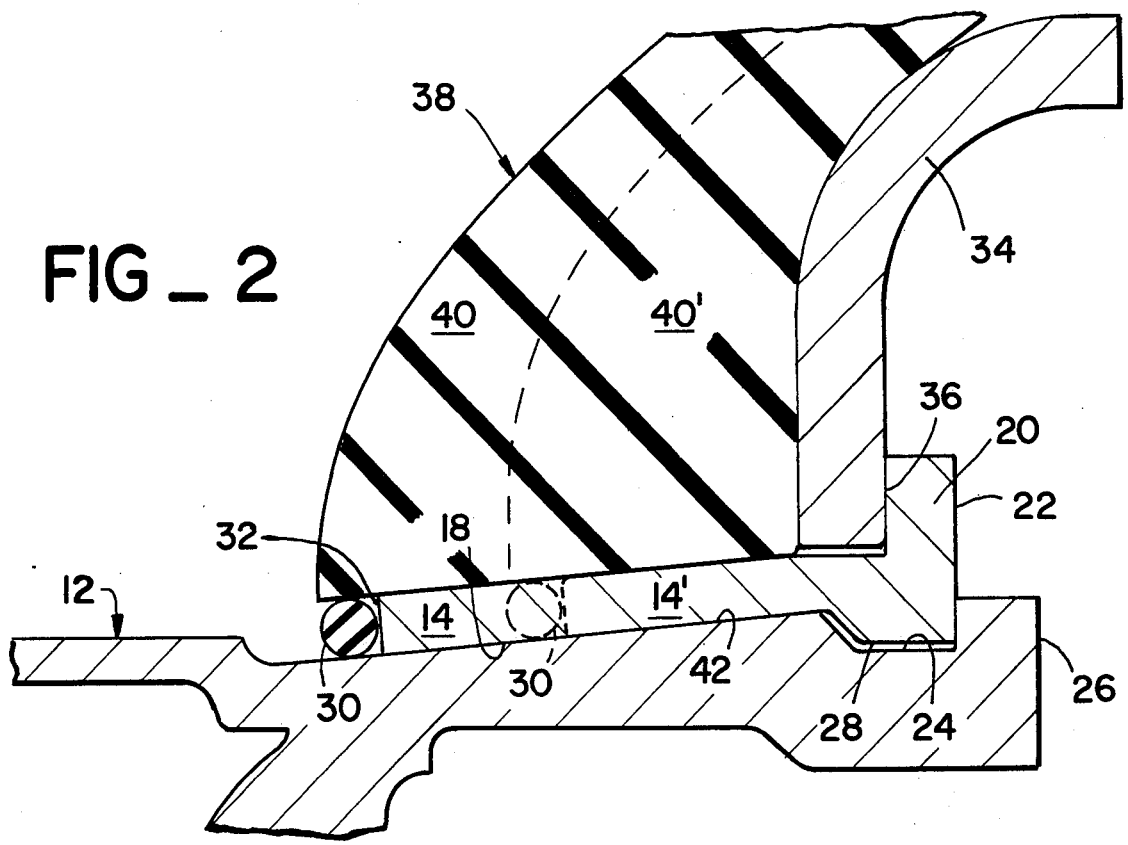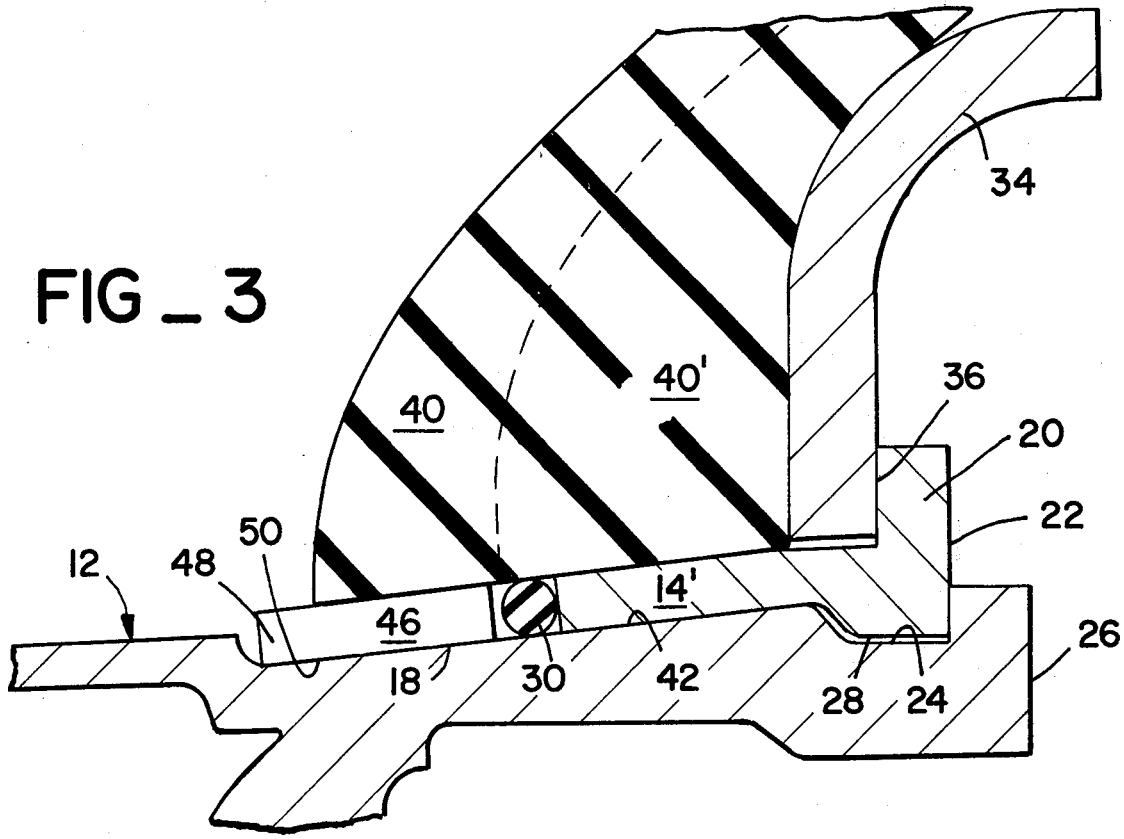

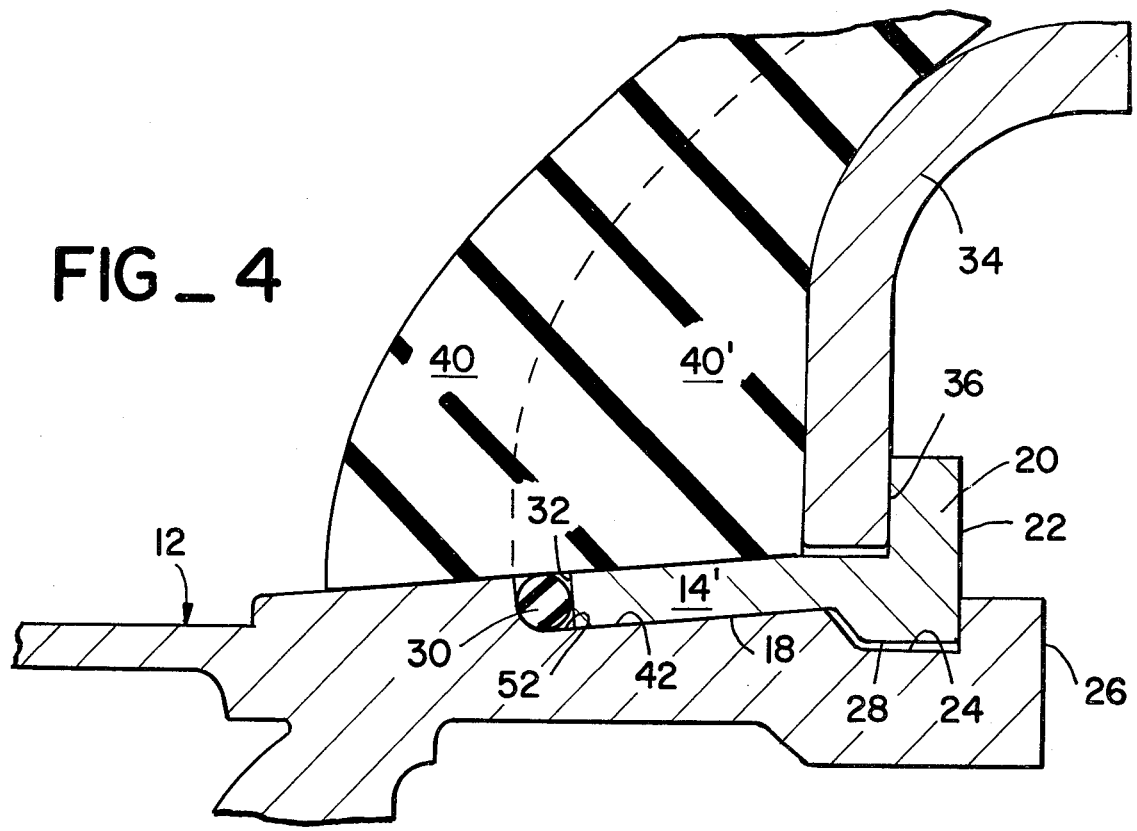
FIG_4
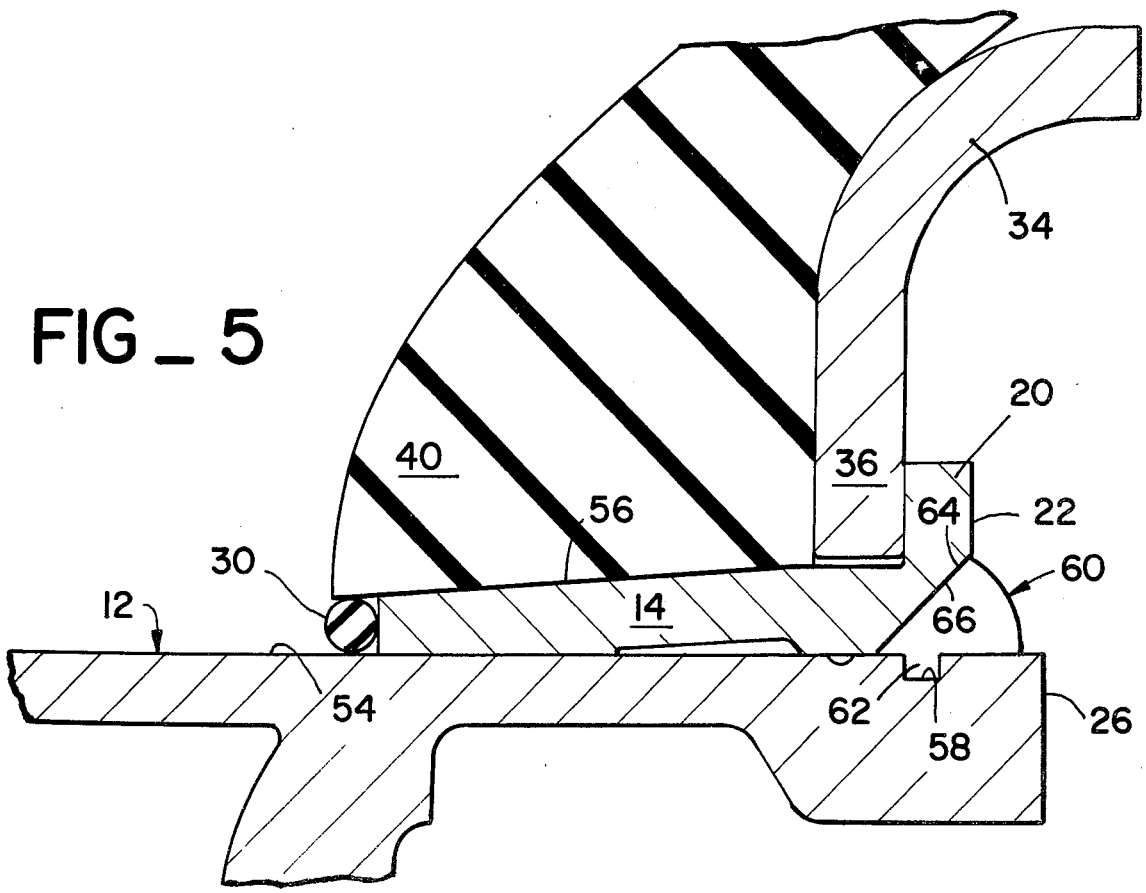
FIG_5

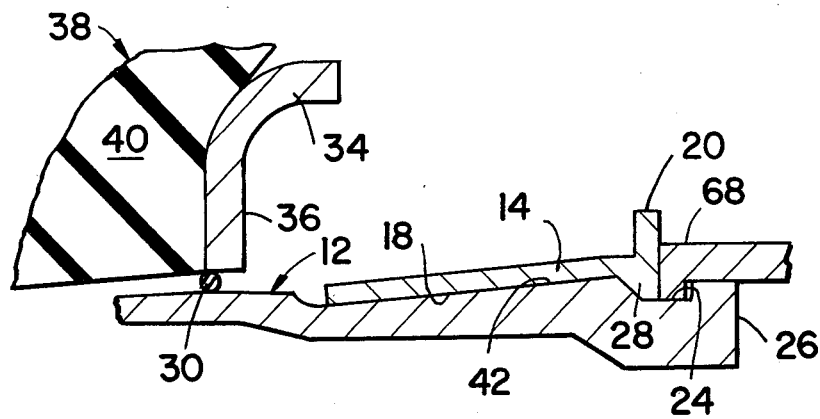
FIG_6
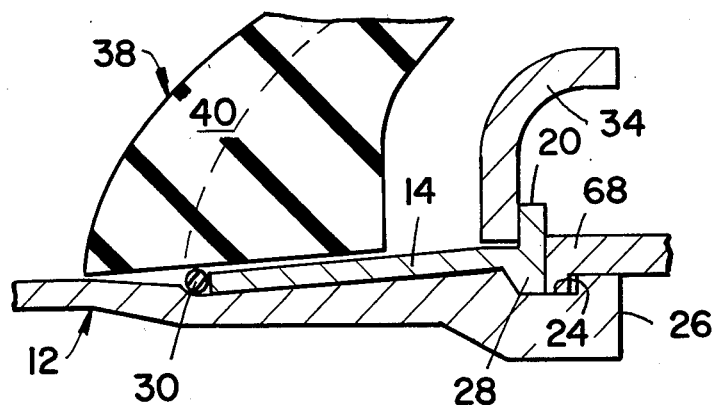
FIG_7
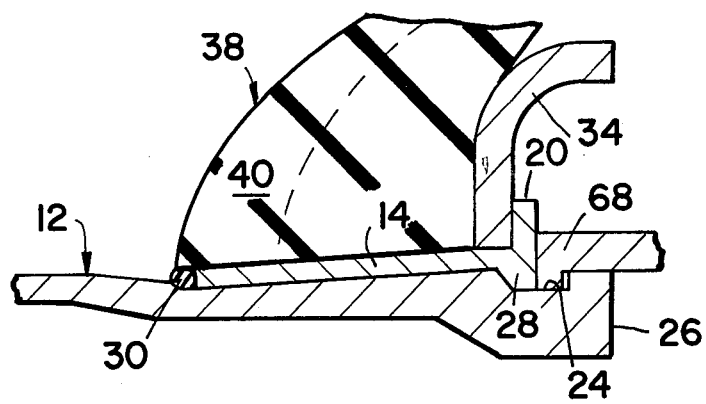
FIG_8
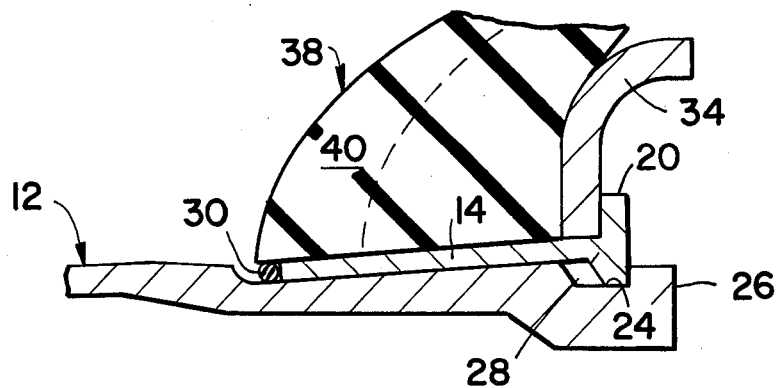
FIG_9

RIM CONSTRUCTION FOR TROUBLE-FREE TIRE MOUNTING

BACKGROUND OF THE INVENTION

1. Field of the Invention

The invention relates to rim construction for an inflatable tire and to a method of mounting an inflatable tire on an improved tire rim structure.

2. Prior Art

The prior art utilizes a wheel rim base with a one piece circular band thereabout. The circular band is normally held in place relative to the rim base by use of a lock ring. A serious problem has existed with such prior art devices in that if the lock ring is not properly seated in its groove prior to inflation of the tire, the tire as it expands can throw parts of the apparatus outwardly. Also, circumferential cracks can develop in the groove for the lock ring thus presenting a safety problem as well as causing scrapping of expensive parts. A butt weld is normally utilized in the prior art construction in the band. Failure of this weld can occur due to shock and fatigue loading experienced in tire and rim combinations on the wheels of an operating vehicle. This creates a chronic problem not only with respect to early scrappage of the parts but also in many cases a problem of blowing out of the tire as it loses pressure through such cracks. In the prior art structure a so-called driver is used to drive the band from the wheel-rim base. This driver is not always able to stop the slippage between the band and the wheel base and can itself fail. This is a particularly bad problem with larger tires, with new parts and with steel radial tires. Once the driver twists out, a crack may develop across the band from the fracture area thus causing a loss of pressure and a subsequent tire blow out. Yet another problem is corrosion of the seat upon the band on which the tire bead sits due to condensed moisture. In this problem the tire bead tends to freeze in its mounted position thus making removal of the bead difficult when it is necessary to demount the tire. In some cases, such demounting becomes actually impossible without some damage to the tire, the wheel-rim base, the band, or the tooling used. Still further, the prior art makes use of a sealing O-ring compressed between the band and the wheel-rim base and problems can occur with this O-ring during mounting, especially at the gap between the ends of the lock ring. Still further, the wedging action of the tire bead as it moves out on the bead seat can contribute to the problem of demounting.

SUMMARY OF THE INVENTION

The present invention is directed to overcoming one or more of the problems as set forth above.

The invention is concerned with a tire arrangement comprising a cylindrically symmetrical wheel-rim base. A circular bead seat band structure having an axially extending slot therethrough and having an inner cylindrically symmetrical surface fits matingly against the base and a flange extends outwardly radially from a first end thereof and is used in combination with the base. Means are provided supported by the base for preventing the band structure from sliding off of the base. An elastomeric ring fits over and in contact with the base, the elastomeric ring fitting against a second end of the band structure. A retainer ring fits over the band structure and has an inner portion abutting against the flange. A tire is used with a bead portion thereof in contact with the band structure, the elastomeric ring and the retainer ring.

In another sense the invention comprises an improvement in a mounted tire arrangement which comprises a cylindrically symmetrical wheel-rim base, a circular bead seat band structure having an inner surface matingly fitting against said base and a flange extending upwardly from a first end thereof, means for preventing said band structure from sliding off of said base, a retainer ring fitting over said band structure and having an inner portion abutting against said flange and a tire having a bead portion thereof in contact with said band structure and said retainer ring. The improvement comprises an axially extending slot through said band structure from said first to a second end thereof and an elastomeric ring fitting over and in contact with said base, said elastomeric ring fitting against said second end of said band structure and against said tire bead portion.

In yet another sense the invention relates to a method of mounting a tire to a cylindrically symmetrical wheel-base. In the method the tire is placed about the base. A retainer ring is placed about the base outward of the tire and in contact with the bead portion thereof. The tire and the retainer ring are positioned a distance inward from an outboard end of the base. An elastomeric ring is positioned about the base and generally outboard of and adjacent to the tire bead portion. A bead seat band structure, having a slot axially therethrough from an outboard to an inboard end thereof, is positioned about the base with the respective outboard ends of the base and the bead seat band structure adjacent one another, the bead seat band structure having a flange extending outwardly radially from the outboard end thereof. Then, the tire is inflated to move the tire bead portion and the retainer ring in the outboard direction.

BRIEF DESCRIPTION OF THE DRAWINGS

The invention will be better understood by reference to the figures of the drawings wherein like numbers denote like parts throughout and wherein:

FIG. 1 illustrates in overall view an apparatus in accordance with the present invention;

FIG. 2 illustrates one embodiment of the present invention;

FIG. 3 illustrates a second embodiment of the present invention;

FIG. 4 illustrates another alternate embodiment of the present invention;

FIG. 5 illustrates still another embodiment of the present invention; and

FIGS. 6–9 illustrate another embodiment yet of the present invention and operation of one embodiment of the method of the present invention.

DETAILED DESCRIPTION OF THE PREFERRED EMBODIMENTS

Adverting to FIGS. 1 and 2, there is illustrated therein a wheel arrangement 10 comprising a wheel rim base 12 of a cylindrically symmetrical shape. A circular bead seat band structure 14 is illustrated which has at least one axially extending slot 16 therethrough. In the particular embodiment illustrated the bead seat band structure 14 is a single band and has a single slot 16 therethrough but it should be understood that the invention is contemplated as being fully applicable with bead seat band structures made of a plurality of sections, at least one of which has an axially extending slot 16 therethrough (formed between adjacent sections). Thus while the following description refers to the bead seat band 14 and the slot 16, it should be understood that this language is used to ease understanding of the invention and not in any limiting sense.

The band 14 has an inner cylindrically symmetrical surface 18 which fits matingly against the base 12. The band 14 also has a flange 20 extending outwardly radially from a first end 22 thereof. Means are provided which prevent the band 14 from sliding off of the base 12. In the particular embodiment illustrated such means comprise a circular undercut 24 which extend inwardly radially into the base 12 with the circular undercut 24 being adjacent a first or outboard end 26 of the base 12. The means for preventing the band 14 from sliding off of the base 12 further includes a rim 28 which extends inwardly radially from the band 14 into the circular undercut 24 adjacent the first end 22 of the band 14 and the first end 26 of the base 12.

Adverting most particularly to FIG. 2 it will be noted that an elastomeric ring 30 is provided which fits over and in contact with the base 12, the elastomeric ring 30 fitting against a second end 32 of the band 14. The elastomeric ring 30 serves the purpose of sealing off the slot 16 which is provided through the band 14.

A retainer ring 34, generally referred to in common parlance as a side flange, fits over the band 14 and has an inner portion 36 which abuts the flange 20 which extends outwardly from the band 14. A tire 38 has a bead portion 40 thereof in contact with the band 14, the elastomeric ring 30 and the retainer ring 34. Thus, it is clear that an air tight seal is formed between the elastomeric ring 30 and each of the tire bead portion 40, the band 14 and the base 12. This allows the use of a split band 14, that is a band 14 having a slot 16 therethrough, a plurality of sections which form the split band 14, one or more of said sections having a slot 16 therethrough or a plurality of sections with a plurality of slots 16 formed between adjacent sections.

It is preferred that the base 12 have an outer conical surface 42 and that an inner cylindrically symmetrical surface 18 of the band 14 be likewise conical. Further, it is preferred that the conical surfaces 18 and 42 should be placed together in mating relationship with the respective larger diameter portions thereof adjacent the undercut 24. In this manner, as the tire 38 is inflated, the tire bead 40 will proceed in an outboard direction forcing the band 14 to slide against the base 12 and to form a tight wedging fit therewith. Preferably the surfaces 18 and 42 are machined for maximum smoothness so that this fit can be as tight as possible.

FIG. 2, in addition to showing the tire bead 40 of the sort that would be used on a bias ply tire, also shows in dashed lines a tire bead 40' as would be used with a typical radial tire. It will be noted that in the embodiment of FIG. 2 different sized bands 14 and 14' must be used respectively with bias ply tires and radial tires.

Adverting to FIG. 3, there is illustrated an alternate embodiment of the present invention wherein a single band 14' can be used with both bias ply tires and radial tires. In this situation an auxiliary circular bead seat band 46 is utilized which also has an axially extending slot 48 therethrough. As with the band 14, the auxiliary band 46 can be structured of several sections, at least one of which has a slot 48, or the slot 48 (or more than one slot 48) can be formed between individual sections which form the band 46. The auxiliary band 46 has an inner cylindrically symmetrical surface 50 which fits against the base 12 on an opposite side of the elastomeric ring 30 from the band 14'. The tire bead portion 40 is then in contact with the aforementioned auxiliary band 46. When operating with a radial tire which has a less thick bead portion 40', one simply does not make use of the auxiliary band 46.

Adverting now to FIG. 4 there is illustrated therein yet another alternate embodiment of the present invention, namely one wherein the conical surface 42 is formed within an undercut 52 in the base 12 and when a radial tire is utilized the bead portion 40' simply fits against the band 14' and against the elastomeric ring 30 and does not touch the base 12; but when a bias ply tire is used the bead portion 40 extends past the elastomeric ring 30 and contacts the base 12.

Referring now to FIG. 5, there is illustrated an embodiment of the present invention which is particularly useful for adaptation of conventional rim bases 12. In the embodiment of FIG. 5 the base 12 includes another generally cylindrical surface 54 while the band 14 includes an outer generally conical surface 56 which has a maximum diameter adjacent the first end 22 thereof. Further the means for preventing the band 14 from sliding off of the base 12 comprises a circular undercut 58 which extends inwardly radially into the base 12. The preventing means further includes a lock ring 60 having a circular ridge 62 which extends inwardly therefrom into tight fitting relation with the aforementioned undercut 58. The lock ring 60 further includes a detent surface 64 which faces generally towards the band 14 and the band 14 includes a detent engaging surface 66 formed at the first end 22 thereof for engagement with the detent surface 64.

Adverting now to FIGS. 6–9, there is illustrated an embodiment of the present invention wherein the undercut 24 in the base 12 extends a greater distance axially than does the rim 28 which fits therewithin. This particular embodiment is particularly advantageous in assuring that the tire bead 40 does not freeze in its mounted position even after wedging of the bead 40 against the band 14. Further, by permitting the band 14 to move outboard a short distance as the tire 38 is inflated, one attains a more tight wedging of the bead 40 against the band 14.

MOUNTING METHOD

A method of mounting a tire 38 to a cylindrically symmetrical wheel base 12 in accordance with the present invention proceeds as follows:

(1) The tire 38 is placed about the base 12.

(2) The retainer ring 34 is placed about the base 12 outboard of the tire 38 and in contact with a bead portion 40 thereof.

(3) The tire 38 and the retainer ring 34 are positioned a distance inward from the outboard end 26 of the base 12.

(4) An elastomeric ring 30 is positioned about the base 12 generally outboard of and adjacent the tire bead portion 40.

(5) A bead seat band 14 is positioned about the base 12 with the respective outboard end of the band 14 and the base 12 adjacent one another. The band 14 has at least one slot 16 longitudinally therethrough from an inboard end thereof to an outboard end thereof and can be made in sections. A flange 20 extends outwardly radially from the outboard end of the band 14.

(6) The tire 38 is then inflated to move the tire bead portion 40 and the retainer ring 34 in the outboard direction. The inflating is generally continued until the inner radial surface 18 of the band 14 is forcibly mated against the base 12. It will be noted in this regard that the base 12 generally includes an outer generally conical surface 42 and that the inner radial surface 18 of the band 14 is generally conical with both conical surfaces having their larger diameters outboard.

Adverting now particularly to the embodiment of the present invention illustrated in FIGS. 6–9, it is noted that in this embodiment the undercut 24 extends axially a greater distance than does the rim 28 which fits therein. In accordance with the method of the present invention for mounting a tire 38 to a cylindrically symmetrical wheel base 12, the embodiment of FIGS. 6–9 relates to an embodiment wherein the base includes the aforementioned circular undercut 24 which extends radially thereinto and the band includes the inwardly radially extending rim 28 which fits in the undercut 24 and further the rim 28 extends axially less than the axial extension of the undercut 24. In the embodiment of FIGS. 6–9 the positioning of the bead seat band 14 comprises positioning the aforementioned rim 28 adjacent an inboard end of the undercut 24 as illustrated in FIG. 6 and the mounting method further includes several steps.

First, the retainer ring 34 is moved to about the band 14 prior to the inflating step. Second, blocking wedge means such as the blocking wedge 68 shown in FIGS. 6–8 is positioned in the undercut 24 on an outboard side thereof prior to the inflating.

After the tire 38 has been inflated as discussed above it is deflated as soon as the tire bead portion 40 has been expanded into contact with the band 14 and the retainer ring 34, and the elastomeric ring 30 has been moved into sealing contact with the tire bead portion 40 and the inboard end of the band 14 as shown in FIG. 8. Next, the blocking wedge means 68 are removed and the tire is reinflated until the rim 28 of the band 14 has been moved to the outboard end of the undercut as illustrated in FIG. 9. Generally the reinflating is continued until the first end 22 of the band 14 is forcibly mated against the base 12. As with the other embodiments illustrated the base 12 will normally include an outer generally conical surface 42 and the band 14 will generally an inner radial conical surface with both conical surfaces having their larger diameters outboard.

In operating in accordance with the present invention there is obtained a safer, stronger, easier to assemble and dissemble rim construction at an equivalent cost to prior art constructions.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A tire arrangement, comprising:
    a cylindrically symmetrical rim base;
    a circular bead seat band structure having an axially extending slot therethrough, said band structure having an inner cylindrically symmetrical surface fitting matingly against said base and a flange extending outwardly radially from a first end thereof;
    means supported by said base for preventing said band structure from sliding off of said base;
    an elastomeric ring fitting over and in contact with said base, said elastomeric ring fitting against a second end of said band structure;
    a retainer ring fitting over said band structure and having an inner portion abutting against said flange;
    a tire having a bead portion thereof in contact with said band structure, said elastomeric ring and said retainer ring;
    an auxiliary circular seat band structure having an axially extending slot therethrough, said auxiliary band structure having an inner cylindrically symmetrical surface fitting against said base on an opposite side of said elastomeric ring from said first mentioned band structure, said tire bead portion contacting said auxiliary band structure.

2. In a mounted tire arrangement which comprises a cylindrically symmetrical wheel rim base, a circular bead seat band structure having an inner surface matingly fitting against said base and a flange extending outwardly from a first end thereof, means for preventing said band structure from sliding off of said base, a retainer ring fitting over said band structure and having an inner portion abutting against said flange and a tire having a bead portion thereof in contact with said band structure and said retainer ring, an improvement comprising:
    an axially extending slot through said band structure from said first to a second end thereof;
    an elastomeric ring fittng over and in contact with said base, said elastomeric ring fitting against said second end of said band structure and against said tire bead portion; and
    an auxiliary circular seat band structure having an axially extending slot therethrough, said auxiliary band structure having an inner cylindrically symmetrical surface fitting against said base on an opposite side of said elastomeric ring from said first mentioned band structure, said tire bead portion contacting said auxiliary band structure.

3. A method of mounting a tire to a cylindrically symmetrical wheel base which has a circular under-cut extending radially thereinto, comprising:
    (1) placing the tire about the base;
    (2) placing a retainer ring about the base outboard of the tire and in contact with a bead portion thereof;
    (3) positioning said tire and said retainer ring a distance inward from an outboard end of said base;
    (4) positioning an elastomeric ring about said base generally outboard of and adjacent said tire bead portion;
    (5) positioning a bead seat band structure having a slot axially therethrough from an outboard to an inboard end thereof and having an inwardly radially extending rim, with said rim fitting in said undercut, said rim extending axially less than the axial extension of said undercut with said rim adjacent an inboard end of said undercut and with said bead seat band structure about said base with the respective outboard ends of said bead seat band structure and said base adjacent one another, said band structure havng a flange extending outwardly radially from said outboard end thereof;

(6) moving said retainer ring to about said band structure;
(7) positioning blocking wedge means in said undercut on an outboard side thereof;
(8) inflating said tire to move said tire bead portion and said retainer ring in the outboard direction until an inner radial surface of said band structure is forceably mated against said base;
(9) deflating said tire after the tire bead portion has been expanded into contact with the band structure and the retainer ring and the elastomeric ring has been moved into sealing contact with the tire bead portion and the inboard end of the band structure;
(10) removing said blocking wedge means; and
(11) reinflating the tire until the rim has been moved to the outboard end of the undercut.

4. A method as in claim 3, wherein said base includes an outer generally conical surface and said inner radial surface of said band is generally conical, both conical surfaces having larger diameters outboard.

5. A method as in claim 3, wherein said reinflating is continued until an inner radial surface of said band structure is forcibly mated against said base.

6. A method as in claim 5, wherein said base includes an outer generally conical surface and said inner radial surface of said band structure is generally conical, both conical surfaces having larger diameters outboard.

* * * * *